(12) United States Patent
Ooshima

(10) Patent No.: US 6,767,667 B1
(45) Date of Patent: Jul. 27, 2004

(54) SEALED BATTERY

(75) Inventor: Tsutomu Ooshima, Utsunomiya (JP)

(73) Assignee: NEC Tokin Tochigi, Ltd., Utsunomiya (JP)

( * ) Notice: Subject to any disclaimer, the term of this patent is extended or adjusted under 35 U.S.C. 154(b) by 19 days.

(21) Appl. No.: 09/722,114

(22) Filed: Nov. 27, 2000

(30) Foreign Application Priority Data

Nov. 25, 1999 (JP) .............................. 11-333646

(51) Int. Cl.[7] .......................... H01M 6/12; H01M 6/46; H01M 2/00; H01M 2/04
(52) U.S. Cl. ....................... 429/162; 429/163; 429/176
(58) Field of Search ................................ 429/162, 163, 429/176

(56) References Cited

U.S. PATENT DOCUMENTS 5,443,925 A * 8/1995 Machida et al. ............... 429/94
5,556,722 A * 9/1996 Narukawa et al. ........... 429/163
5,916,707 A * 6/1999 Omaru et al. ................ 429/163
6,248,472 B1 * 6/2001 Kelemen ..................... 429/163

* cited by examiner

Primary Examiner—Patrick Ryan
Assistant Examiner—Julian Mercado
(74) Attorney, Agent, or Firm—Westerman, Hattori, Daniels & Adrian, LLP

(57) ABSTRACT

The present invention provides a battery, in which swelling or expansion of side surface of a battery case when the battery is charged is reduced. The invention provides a sealed battery, accommodating a battery element of flat shape, said battery element comprising a positive electrode and a negative electrode being laminated on each other with a separator interposed between them and being wound together, characterized in that a recessed portion is formed on a side surface of a battery case running in parallel to a flat surface of the battery element, said recessed portion having a central axis running in parallel to said flat surface and being positioned on a surface passing through the center of the battery case and running perpendicularly to the surface in parallel to the flat surface of the battery element.

2 Claims, 3 Drawing Sheets

Shape of battery case

SEALED BATTERY

BACKGROUND OF THE INVENTION

The present invention relates to a rectangular type battery. In particular, the invention relates to a rectangular type battery comprising a positive electrode and a negative electrode laminated on each other with a separator interposed between them, and also to a sealed battery such as a lithium ion battery.

In devices and equipment using batteries, a battery accommodating compartment designed in form of rectangular parallelepiped is generally used. When a cylindrical battery is accommodated in the battery accommodating compartment in form of rectangular parallelepiped, there is a problem in that ineffective volume is increased. Further, diameter of the cylindrical battery is limited by the thickness of the battery accommodating compartment. For this reason, in small-size or thin-walled devices or equipment, a rectangular type sealed battery with smaller thickness is used instead of a cylindrical type battery.

In these batteries, capacity of the battery depends on the quantity of active components in the positive electrode and the negative electrode laminated on each other with a separator interposed between them. The positive and the negative electrodes are produced as follows: A positive electrode active component and a negative electrode active component, each on a belt-like metal base, are coated on each of a positive electrode current collector and a negative electrode current collector respectively. By increasing the coating thickness of the active components, it is possible to increase electric capacity of the positive electrodes and the negative electrodes.

A battery element is prepared by laminating the positive electrode and the negative electrode on each other via a separator, and this battery element is accommodated in a battery case. When the thickness of active component layers of the positive and the negative electrodes is increased in the battery, the swelling or the expansion of the battery case when the battery is charged is unavoidably increased.

When the swelling of the battery case is increased, there may be difficulties in disposing the battery on the devices or equipment where the battery is used or ineffective space may be increased in order to provide surplus space to cope with the anticipated swelling.

JP-07183010(A) describes a method for manufacturing a rectangular type sealed battery. In this method, a side surface of an external case of the battery in contact with the battery element is designed in recessed form.

However, in a battery with smaller thickness where the side surface is merely depressed, it is difficult to attain sufficient effect.

It is an object of the present invention to provide a rectangular type battery, by which it is possible to prevent swelling or expansion of the side surface of the battery case caused by swelling of the battery element when the battery is charged, and also to eliminate useless or ineffective space in the battery accommodating compartment.

SUMMARY OF THE INVENTION

The present invention provides a sealed battery, accommodating a battery element of flat shape, said battery element comprising a positive electrode and a negative electrode being laminated on each other with a separator interposed between them and being wound together, characterized in that a recessed portion is formed on a side surface of a battery case running in parallel to a flat surface of the battery element, said recessed portion having a central axis running in parallel to said flat surface and being positioned on a surface passing through the center of the battery case and running perpendicularly to the surface in parallel to the flat surface of the battery element.

Also, the present invention provides the sealed battery as described above, wherein a vertical wall surface is designed in form of a small curved surface, and said wall surface connecting an end of the recessed portion in form of curved surface on an opening of the battery case with a side surface in parallel to the flat surface of the battery element in the battery case, and a distance from the wall surface to the opening end of the battery is gradually reduced toward the center.

DESCRIPTION OF THE PREFERRED EMBODIMENT

A sealed battery according to the present invention comprises a battery element in flat shape. A positive electrode and a negative electrode are laminated on each other with a separator interposed between them. This is wound up to prepare a battery element in flat shape, and these battery element is accommodated in a sealed battery. It has been found in this type of battery that the battery case is deformed due to swelling or expansion of the flat surface in perpendicular direction when the battery is charged, and this deformation can be suppressed or eliminated by forming a recessed portion on wall surface of the battery case to a specific shape.

Specifically, if a recessed portion with curved bottom surface is formed on a side surface of the battery case facing to the flat surface of a battery element, the swelling or expansion of the battery case can be effectively suppressed when the battery is charged compared with the case where a planar recess is formed.

Description will be given below on the present invention referring to the attached drawings.

Figure 1:
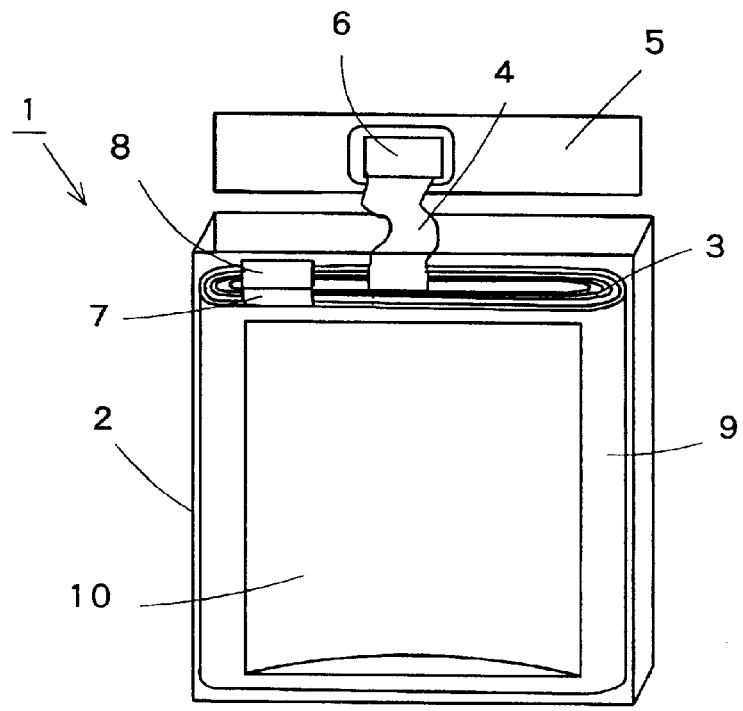
FIG. 1 is a perspective view of a sealed battery of the present invention.

FIG. 1 is a perspective view of a sealed battery of the present invention, showing inner structure of a battery case in through-vision view;

In a sealed battery 1 of the present invention, a positive electrode and a negative electrode are laminated on each other with a separator interposed between them in a rectangular type battery case 2, and these are wound up in flat shape. Then, this is pressurized to have flat shape to match the shape of the battery case, and a battery element 3 is prepared. Then, this is accommodated in the battery case. A current collecting tab 4 from one of the electrodes is connected to a current leading terminal 6 provided on a top cover 5 of the battery case. Another current collecting tab 7 from the other electrode is connected to an inner surface 8 of the battery case.

On a side surface 9 of the battery case running in parallel to the flat surface of the battery element, a curved recess 10 is formed. The curved recess has its central axis running in parallel to a flat surface on the side of the battery case and is formed on a surface passing through the center of the battery case and running perpendicularly to a flat surface of the battery element, i.e. a surface running perpendicularly to the side surface 9 of the battery case, and it has a concave surface depressed toward the inner part of the battery case.

In the sealed battery of the present invention, the central portion of the flat surface of the battery element is swollen or expanded at the most when the battery is charged. According to the present invention, such swelling or expansion of the battery element can be suppressed or prevented because the swelling or expanding surface is pressed against convex portion of the curved surface provided on the side surface of the battery case.

It is preferable that the curved surface is provided at the center of the side surface 9 of the battery case positioned in parallel to the flat surface of the battery case as in the present invention.

The depth from the side surface 9 of the battery case in parallel to the flat surface to the deepest portion (the most depressed portion) of the curved surface can be adjusted by selecting the size of the battery case or thickness of a metal material of the battery case.

Figure 2:
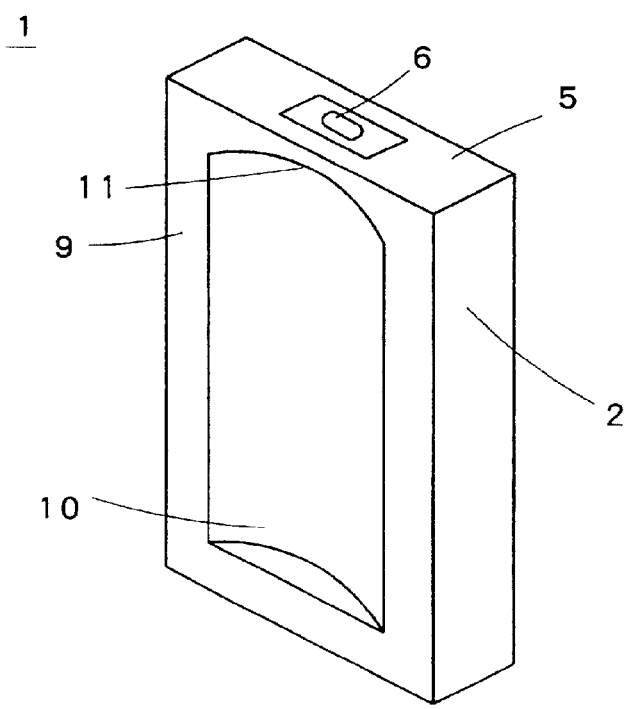
FIG. 2 is a drawing to explain another example of the sealed battery of the present invention.

FIG. 2 is a perspective view to explain another example of the sealed battery of the present invention.

A recessed portion 10 with curved surface is formed on the side surface 9 of the battery case positioned in parallel to the flat surface of the battery element in the sealed battery 1. The recessed portion 10 comprises a curved surface, which has a central axis running in parallel to the flat surface on outer side of the battery case. It is on a surface passing through the center of the battery case and positioned perpendicularly to the flat surface of the battery element, i.e. a surface perpendicular to the side surface of the battery case. It has a curved surface depressed toward the inner part of the battery case.

A wall surface perpendicular to the surface 9 of the battery case is formed by the end of the recessed portion with curved surface positioned on an opening of the battery case and the side surface 9 of the battery case. A distance from this wall surface to an end of the opening of the battery case is reduced toward the center, i.e. this wall surface is formed as an arcuate curved surface 11.

The closer the arcuate curved surface 11 is positioned to the upper opening end of the battery case, the more the effect is obtained to suppress the swelling or expansion of the battery case. When a current collecting tab connected to the battery element is connected to the inner wall surface of the battery case, it is difficult to connect by welding if the connecting portion is in form of curved surface, and the connecting portion must be designed as a flat surface. For this reason, it must be in such size that a flat surface serving as the connecting portion can be maintained.

In the following, description will be given on embodiments of the present invention.

EXAMPLE 1

Figure 3:
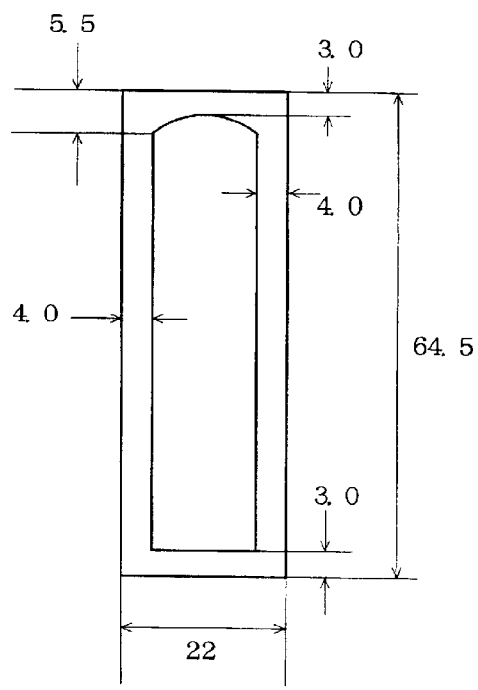
FIG. 3 is a schematical drawing of a sealed battery of an embodiment of the invention.

A soft steel plate in the size of 64.5×22×6.3 mm (height× length×width) and in thickness of 0.35 mm was processed by nickel plating. On a side surface of a battery case, which is made of this soft steel plate, a curved recess with a depth of 1.5 mm was formed. As shown in FIG. 3, the lower end of the recessed portion was at a distance of 3.0 mm from the bottom of the battery case, and the upper end of the recessed portion was at a distance of 5.5 mm from the upper opening of the battery case. An arcuate wall surface was formed from a position at 5.5 mm from the upper opening of the battery case to a position at 3.0 mm from the upper opening end. The central axis of the curved surface is on the surface, which has the central axis running perpendicularly to the side surface with the larger surface area.

A mixture comprising 92 weight parts of lithium manganate ($Li_{1+x}Mn_{2-x}O_4$) powder, 5 weight parts of carbon black, and 3 weight parts of vinylidene polyfluoride was coated on an aluminum foil and was dried, and a positive electrode was prepared. A mixture comprising 91 weight parts of graphitized meso-carbon microbeads (MCMB; Osaka Gas Co., Ltd.), 1 weight part of carbon black, and 8 weight parts of vinylidene polyfluoride was coated on a copper foil and was dried, and a negative electrode was prepared. Separators made of fine porous polypropylene film were placed on both surfaces of the negative electrode, and both electrodes were wound up together in spiral form so that the negative electrode is exposed to outside, and the battery element thus prepared was accommodated in the battery case.

In a mixed solvent comprising 30 volume parts of ethylene carbonate and 70 volume parts of diethyl carbonate, $LiPF_6$ was dissolved to have concentration of 1.0 mol/l, and an electrolytic solution was prepared. This electrolytic solution was injected into the battery case, and a lithium ion secondary battery was prepared.

Figure 4:
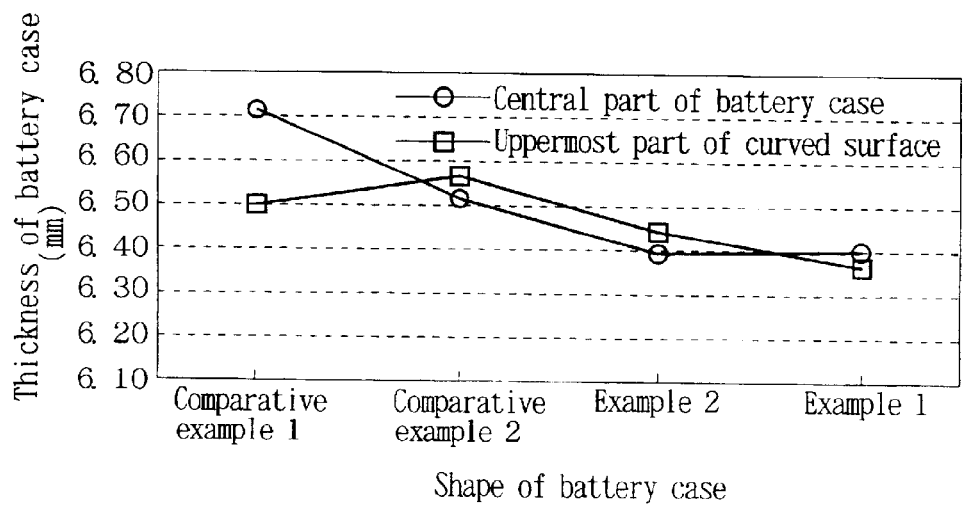
FIG. 4 is a diagram to explain thickness of the battery.

On each of 20 secondary batteries thus prepared, measurement was made on thickness at the center of the battery and thickness at the uppermost position where the upper curved surface of the battery case and the side surface of the battery case were joined together. Average values calculated from the measured values are shown in FIG. 4.

EXAMPLE 2

Batteries were prepared by the same procedure as in Example 1 except that an arcuate wall surface was not provided near the opening of the curved surface and a horizontal wall surface was disposed at the bottom of the battery case in the same manner as near the case bottom. Measurement was made on thickness of each battery case by the same procedure as in Example 1. The results are shown in FIG. 4.

Comparative Example 1

A sealed battery was prepared by the same procedure as in Example 1 except that the recessed portion was not formed on the side surface. The results of measurement are shown in FIG. 4.

Comparative Example 2

A sealed battery was prepared by the same procedure as in Example 1 except that a recessed portion in planar shape was formed with its bottom positioned at a depth of 1.5 mm from the side surface instead of the recessed portion in curved surface. The results of the measurement are shown in FIG. 4.

EXAMPLE 3

Figure 5:
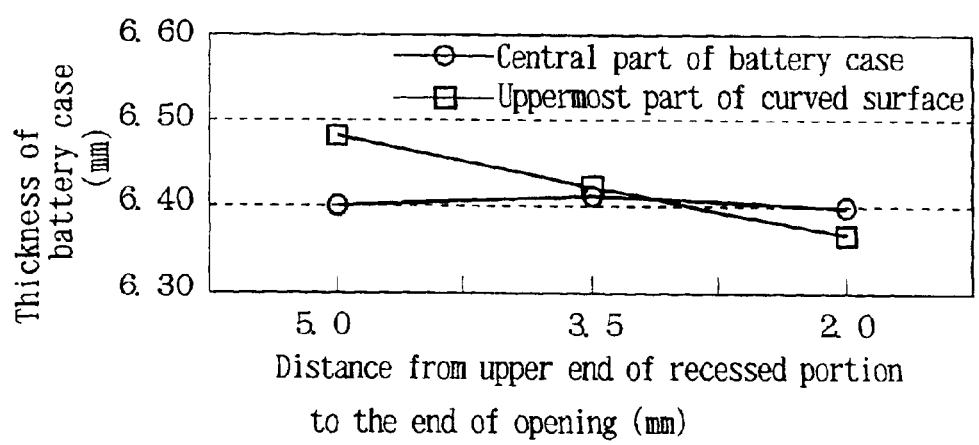
FIG. 5 is a diagram to explain thickness of the battery.

A concave surface was formed in the same manner as in Example 1 except that the distance from the opening of the battery case to the uppermost end of the arcuate form was changed to 5 mm, 3.5 mm and 2.0 mm respectively, and thickness of each battery case was measured. The results are shown in FIG. 5. From these results, it was found that the shorter the distance to the uppermost end was, the thinner the thickness of the battery case at the uppermost part of the curved surface was.

As described above, by forming a recessed portion in form of a curved surface on the side surface of the battery case, swelling or expansion of the battery case can be suppressed when the battery is charged, and thickness of the battery case can be maintained within a predetermined limit.

What is claimed is:

1. A sealed battery, accommodating a battery element of flat shape, said battery element comprising:
   a positive electrode and a negative electrode being laminated onto each other with a separator interposed between them and being would together; and
   a battery case containing said positive and negative electrode, comprising:
   a front wall, a back wall, and two parallel side walls perpendicular to and connecting said front wall and said back wall said walls surrounding an inside of said battery case having a top and a bottom,
   wherein a portion of said front wall is recessed and protrudes into the inside of said battery case, and wherein said recessed portion is curved so that the distance from said recessed portion to the top of said battery case is less at a horizontal center between said sides than at a point horizontally nearer to either of said sides.

2. A sealed battery according to claim 1, wherein said battery is a lithium ion battery.

* * * * *